(12) United States Patent
Sekii et al.

(10) Patent No.: US 8,120,872 B2
(45) Date of Patent: Feb. 21, 2012

(54) SPINDLE MOTOR AND DISK DRIVE APPARATUS

(75) Inventors: Yoichi Sekii, Kyoto (JP); Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 12/952,319

(22) Filed: Nov. 23, 2010

(65) Prior Publication Data
US 2011/0122530 A1    May 26, 2011

(30) Foreign Application Priority Data
Nov. 25, 2009    (JP) .................................. 2009-266941

(51) Int. Cl.
*G11B 33/12* (2006.01)
*H02K 5/22* (2006.01)

(52) U.S. Cl. .................................. 360/99.08; 310/67 R
(58) Field of Classification Search ............... 360/99.08, 360/98.07; 310/71, 67 R; 361/679.33
See application file for complete search history.

(56) References Cited

U.S. PATENT DOCUMENTS

| | | | | |
|---|---|---|---|---|
| 5,548,458 A * | 8/1996 | Pelstring et al. | ........... | 360/99.08 |
| 5,831,355 A * | 11/1998 | Oku | ........... | 310/12.31 |
| 6,097,121 A * | 8/2000 | Oku | ........... | 310/91 |
| 6,545,379 B2 * | 4/2003 | Gomyo | ........... | 310/68 R |
| 6,943,983 B2 * | 9/2005 | Komatsu et al. | ........... | 360/99.04 |
| 7,105,963 B2 * | 9/2006 | Ito et al. | ........... | 310/71 |
| 7,122,929 B2 * | 10/2006 | Kuwert et al. | ........... | 310/90 |
| 7,684,146 B1 | 3/2010 | Andrikowich et al. | | |
| 7,757,378 B1 | 7/2010 | Mann et al. | | |
| 2004/0036371 A1 * | 2/2004 | Kuwert et al. | ........... | 310/90 |
| 2005/0206255 A1 | 9/2005 | Yoshino et al. | | |

FOREIGN PATENT DOCUMENTS

JP    2005-210787 A    8/2005

OTHER PUBLICATIONS

Saichi et al.; "Spindle Motor Having Connecting Mechanism Connecting Lead Wire and Circuit Board, and Storage Disk Drive Having the Same"; U.S. Appl. No. 13/029,143, filed Feb. 17, 2011.

* cited by examiner

*Primary Examiner* — Angel A. Castro
(74) *Attorney, Agent, or Firm* — Keating & Bennett, LLP (57) ABSTRACT

A stator portion of a spindle motor includes a substantially cup-shaped base member including a bottom portion expanding in a radial direction, and a wall portion extending upwards from an outer edge portion of the bottom portion. A circuit board is fixed to a lower surface of the base member in a position on the outer side in the radial direction and on the upper side than the bottom portion. Accordingly, the thickness of the spindle motor in the axial direction can be reduced. The base member has a through hole formed axially through the bottom portion. An opening edge portion of the base member is covered with the insulating layer. A conducting wire from a coil is drawn through the through hole, led out along the surface of the insulating layer, and connected to the circuit board positioned on the outer side in the radial direction than the bottom portion. Accordingly, the conducting wire can be led to the circuit board while the electric connection between the conducting wire and the opening edge portion can be prevented.

20 Claims, 7 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

In hard disk drives and in optical disk drives, spindle motors arranged to rotate a disk around a center axis are typically used. These spindle motors include a stator portion fixed to a housing of an apparatus and a rotating portion arranged to support and rotate the disk. The spindle motors generate a torque around the center axis through the use of a magnetic flux generated between the stator portion and a rotating portion, to thereby rotate the rotating portion with respect to the stator portion.

The stator portion typically includes a coil arranged to generate the magnetic flux and an end of the wire of the coil is led to the outside of the spindle motor and connected to a predetermined circuit board. For example, Japanese Laid-Open Patent Publication No. 2005-210787 describes, in paragraph [0023], that the end of the wire of the coil is led to the outside of the motor and electrically connected to a land of a flexible wiring board by soldering.

In the spindle motor described in Japanese Laid-Open Patent Publication No. 2005-210787, the flexible wiring board is disposed under the coil, and the end of the wire is led out through a hole formed through the base and the flexible wiring board. Then, the end of the wire is electrically connected to the land disposed in the vicinity of the hole by soldering.

However, if the wiring board and the soldering portion are arranged beneath the coil, the thickness in the axial direction of the spindle motor will be increased as the thicknesses in the axial direction of the wiring board and the soldering portion is increased. In order to reduce the total thickness in the axial direction of the spindle motor while the wiring board and the soldering portion are disposed beneath the coil, it is necessary to design the base and the coil such as to have reduced thicknesses in the axial direction. However, when the size in the axial direction of the base is reduced, the base consequently becomes thinner which acts to decrease the rigidity of the base. Further, if the size in the axial direction of the coil is reduced, the number of windings of the conducting wire is decreased, so that the amount of torque for rotating the spindle motor is lowered.

On the other hand, if the wiring board and the soldering portion are arranged in positions on the outer side in a radial direction than the coil, it is necessary to lead the conducting wire drawn from the coil to the lower side of the base to the soldering portion on the outer side in the radial direction. However, this procedure leads to the thin insulating layer of the conducting wire becoming defective due to the contact between the conducting wire and the base.

SUMMARY OF THE INVENTION

According to a first preferred embodiment of the present invention, a spindle motor includes a stator portion, and a rotating portion supported in a rotatable manner around a vertically extending center axis with respect to the stator portion. The stator portion preferably includes a substantially cup-shaped base member having a bottom portion expanding in a radial direction, a wall portion extending upwards from an outer edge portion of the bottom portion, and a through hole arranged to axially extend through the bottom portion; a coil accommodated in the base member; a circuit board electrically connected to the coil and fixed to predetermined portions of the base member; an insulating layer arranged to cover an opening edge portion on the lower side of the through hole of the bottom portion; and a conducting wire extending from the coil being drawn through the through hole, led out along a surface of the insulating layer, and connected to the circuit board positioned on the outer side in the radial direction than the bottom portion.

According to the above-described preferred embodiment of the present invention, the circuit board is arranged at a portion on the outer side in the radial direction and above the bottom portion, such that the thickness of the spindle motor in the axial direction will be reduced. Further, according to the above-described preferred embodiment of the present invention, an electrical contact between the conducting wire and the opening edge portion will be prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described in detail with reference to FIGS. 1 through 7. Note that the terms "axial direction", "axial", and "axially" as used herein refer to a direction parallel or substantially parallel to a central axis J, whereas the terms "radial direction", "radial", and "radially" as used herein refer to directions perpendicular or substantially perpendicular to the central axis J. Also note that it is assumed herein that a side at which a coil is arranged with respect to a base member is defined as an upper side along the central axis. Note, however, that the central axis may not necessarily be parallel or substantially parallel to the direction of gravity in actual practice.

Figure 1:
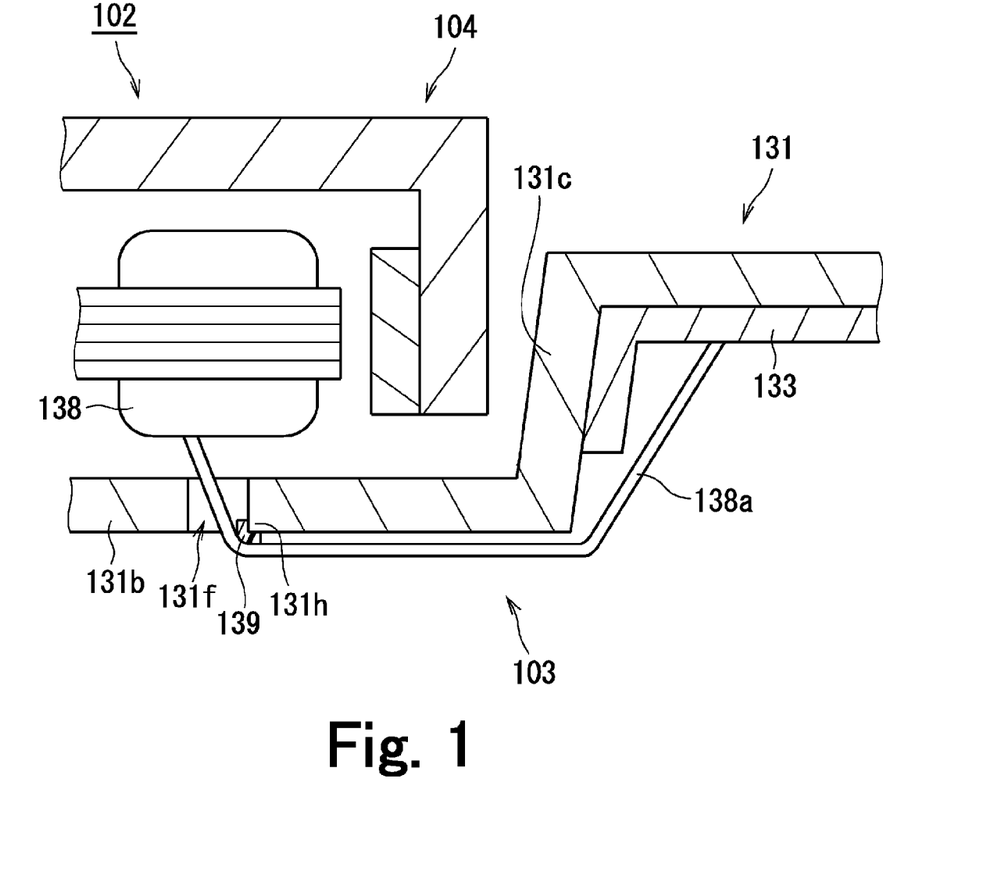
FIG. 1 is a schematic partial section view of a spindle motor according to a first preferred embodiment of the present invention.

FIG. 1 is a schematic partial section view of a spindle motor 102 according to a preferred embodiment of the present invention. As shown in FIG. 1, the spindle motor 102 preferably includes a stator portion 103 and a rotor portion 104. The rotor portion 104 is arranged to be supported rotatably with respect to the stator portion 103 around its vertically extending center axis.

The stator portion 103 preferably includes a base member 131, a coil 138, a circuit board 133, and an insulating layer 139. The base member 131 preferably includes a substantially cup-shaped portion including a bottom portion 131b expanding in a radial direction and a wall portion 131c extending upwards from an outer edge portion of the bottom portion 131b. The base member 131 also preferably includes a through hole 131f which is arranged at the bottom portion 131b in the axial direction. The coil 138 is preferably accommodated in the substantially cup-shaped portion of the base member 131.

The circuit board 133 is preferably fixed to a portion of the lower surface of base member 131 that is radially outside of the bottom portion 131b. In other words, the circuit board 133 is preferably arranged in a position which does not overlap with the other members accommodated in the substantially cup-shaped portion of the base member 131 in the axial direction. Accordingly, axial dimensions of the spindle motor 102 can be reduced. The circuit board 133 is electrically connected to the coil 138 via a conducting wire 138a.

An opening edge portion 131h of the base member 131 is preferably arranged at the lower side of an outer circumference of the opening of the through hole 131f. The opening edge portion 131h is preferably covered with the insulating layer 139. The conducting wire 138a is preferably led from the coil 138 to the lower side of the bottom portion 131b through the through hole 131f and along the surface of the insulating layer 139. In addition, the conducting wire 138a is preferably led to the outer side in the radial direction of the bottom portion 131b, and then connected to the circuit board 133. Therefore, the conducting wire 138a can be led to the circuit board 133, while the conducting wire 138a is prevented from becoming electrically connected to the base member 131 at the opening edge portion 131h.

Figure 2:
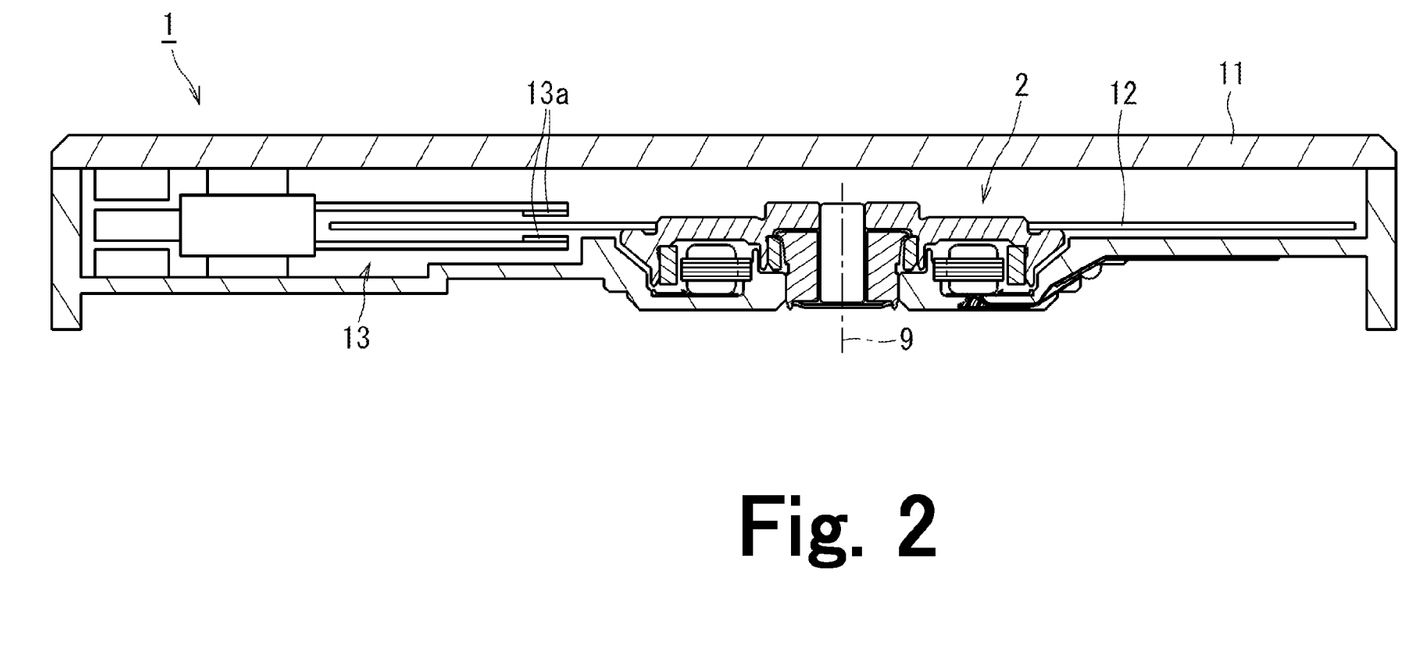
FIG. 2 is a schematic section view of a disk drive apparatus according to the present invention.

FIG. 2 is a schematic sectional view of the disk drive apparatus 1 according to a preferred embodiment of the present invention. The disk drive apparatus 1 is preferably an apparatus which rotates a magnetic disk 12 (hereinafter simply referred to as "a disk 12"), thereby performing the reading and writing of data from and onto the disk 12. As shown in FIG. 2, the disk drive apparatus 1 preferably includes a housing 11, a disk 12, an access unit 13, and a spindle motor 2.

The housing 11 is preferably a case body arranged to accommodate the disk 12, the access unit 13, and the spindle motor 2 therein. The access unit 13 is arranged to move a head 13a along a recording surface of the disk 12 supported by the spindle motor 2, thereby performing the reading and writing of data from and onto the disk 12. Note that the access unit 13 may perform either the reading or the writing of data with respect to the disk 12.

Figure 3:
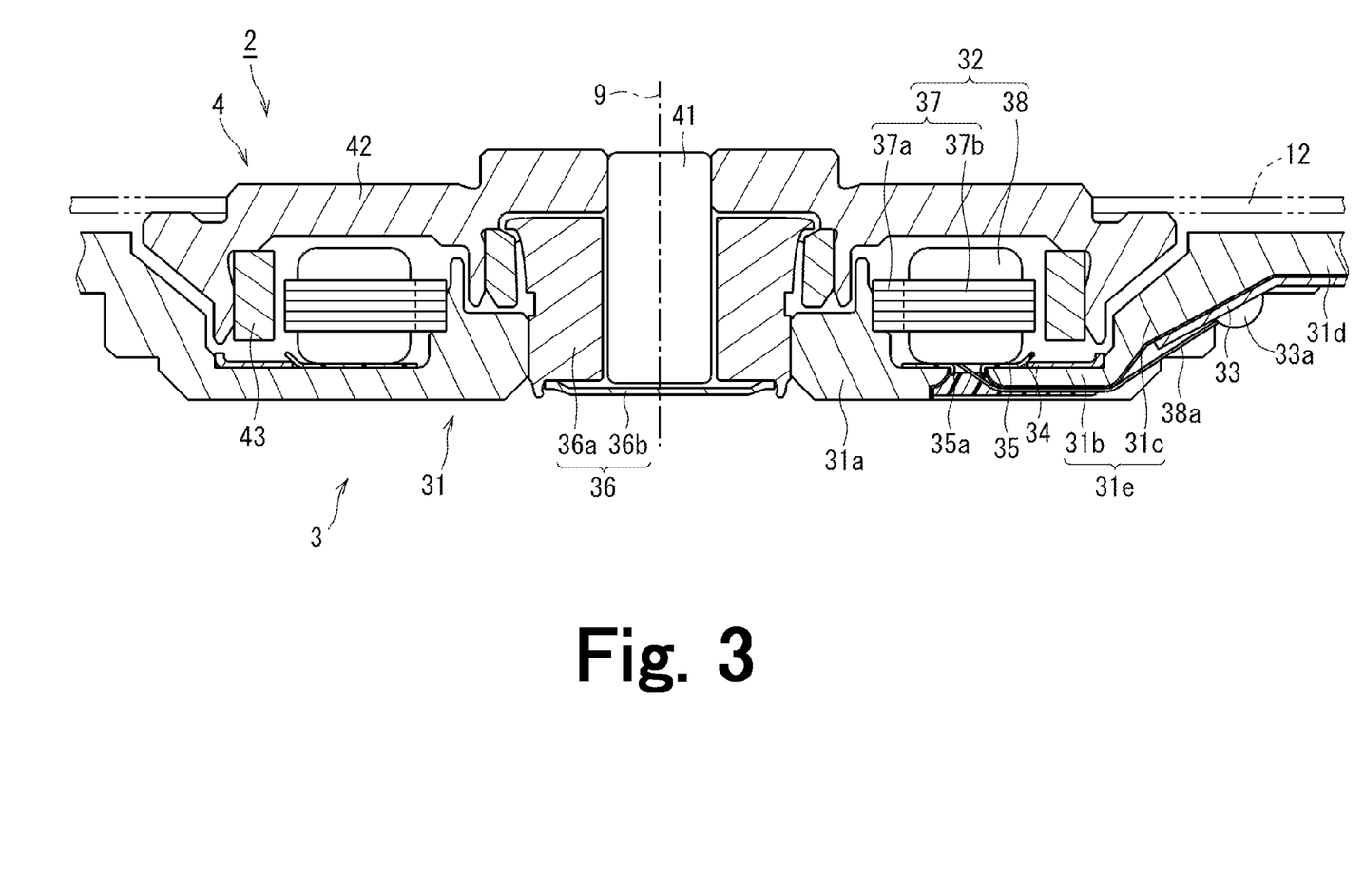
FIG. 3 is a schematic section view of a spindle motor according to a preferred embodiment of the present invention.

Next, the construction of the above-mentioned spindle motor 2 will be described. FIG. 3 is a longitudinal section view of the spindle motor 2. As shown in FIG. 3, the spindle motor 2 preferably includes a stator portion 3 fixed to the housing 11 of the disk drive apparatus 1, and a rotating portion 4, arranged to support the disk 12, which rotates around the center axis 9 together with the disk 12.

The stator portion 3 preferably includes a base member 31, a stator unit 32, a circuit board 33, a thrust yoke 34, an insulating sheet 35, and a stationary bearing unit 36.

The base member 31 is a portion of the housing 11 of the disk drive apparatus 1 (see FIG. 2). The base member 31 is provided integrally with the other portions of the housing 11. The base member 31 preferably includes a cylindrical portion 31a, a bottom portion 31b, a wall portion 31c, and an outer flat plate portion 31d.

The cylindrical portion 31a preferably extends upwards from an inner edge portion of the bottom portion 31b. The bottom portion 31b preferably includes a substantially circular disk portion extending outwards in the radial direction (a direction perpendicular or substantially perpendicular to the center axis 9) from a lower end portion of the cylindrical portion 31a. The wall portion 31c preferably includes a portion expanding diagonally upwards from an outer edge portion of the bottom portion 31b to the outer side in the radial direction. The outer flat plate portion 31d preferably includes a portion extending from an outer edge portion of the wall portion 31c to the outer side in the radial direction.

The bottom portion 31b and the wall portion 31c of the base member 31 define an accommodating portion 31e having a substantial cup shape with an open top. On the inside of the accommodating portion 31e, the stator unit 32, the thrust yoke 34, the insulating sheet 35, and a rotor magnet 43 which will be described later are accommodated. On the other hand, the circuit board 33 is arranged on the outer side in the radial direction than the bottom portion 31b. In the spindle motor 2 according to the present preferred embodiment, the stator unit 32 and the circuit board 33 are not arranged to overlap with each other in the axial direction, but they are arranged at substantially the same level in the axial direction. By virtue of such configuration, the axial dimensions of the spindle motor 2 can be reduced.

In the present preferred embodiment, the base member 31 and the housing 11 preferably are integrally provided as a single member. Alternatively, the base member 31 and the housing 11 may be defined as separate members.

The stator unit 32 preferably includes a stator core 37 and a plurality of coils 38. The stator unit 32 generates a magnetic flux in response to the driving current applied to the coils 38. The stator core 37 preferably includes a core back 37a having a substantially circular ring shape, and a plurality of teeth 37b each extending outwards in the radial direction from the core back 37a. The core back 37a is preferably fixed to an outer circumference of the cylindrical portion 31a of the base member 31. The stator core 37 is preferably, for example, a laminated body in which a plurality of electromagnetic steel plates are laminated in an axial direction (a direction along the center axis 9). However, any other desirable type of stator core could also be used.

Each of the coils 38 preferably includes conducting wires wound around the respective teeth portion 37b of the stator core 37. The coils 38 are preferably positioned above the bottom portion 31b of the base member 31. Each coil 38 according to the present preferred embodiment of the present invention preferably includes three conducting wires 38a arranged to supply respective currents of three-phase alternating currents. End portions of the three conducting wires 38a on the input side are led through the through hole 31f arranged at the bottom portion 31b to the lower side of the bottom portion 31b.

The circuit board 33 preferably includes an electronic circuit arranged to apply a driving current to the coils 38. The circuit board 33 according to the present preferred embodiment is preferably a flexible printed circuit (FPC), though any other type of circuit board could be used. The circuit board 33 is preferably fixed to an outer side surface of the wall portion 31c of the base member 31 and a lower surface of the outer flat plate portion 31d via an adhesive. The circuit board 33 at a portion thereof fixed to the wall portion 31c preferably includes a soldering portion 33a. End portions of the conducting wires 38a on the input side led out from the coil 38 are preferably connected to the soldering portion 33a.

According to the present preferred embodiment, the outer side surface of the wall portion 31c is an inclined surface extending upwards and outwards in the radial direction. Accordingly, as compared with the case where the outer side surface of the wall portion 31c extends steeply with respect to the lower surface of the bottom portion 31b, the conducting wire 38a can be led gently along the outer side surface of the wall portion 31c. In addition, due to the soldering portion 33a, the occurrence of a lifting of the conducting wires 38a with respect to the base member 31 can be substantially minimized.

The thrust yoke 34 is a substantially annular member fixed to an upper surface of the bottom portion 31b of the base member 31. The thrust yoke 34 preferably includes a magnetic material such as an electromagnetic steel plate (e.g. silicon steel plate), ferromagnetic stainless steel (e.g. SUS430), a cold rolling steel plate (e.g. SPCC, SPCE), or the like. The thrust yoke 34 attracts the rotating portion 4 toward the stator portion 3 via magnetic attraction induced between the thrust yoke 34 and the rotor magnet 43 which will be described later, thereby stabilizing the rotating attitude of the rotating portion 4.

The insulating sheet 35 is preferably a sheet-shaped member arranged between the bottom portion 31b of the base member 31 and the coils 38. The insulating sheet 35 preferably includes, for example, a polyethylene terephthalate (PET) layer. The insulating sheet 35 prevents the electric connection between the bottom portion 31b of the base member 31 and the coils 38. The insulating sheet 35 preferably includes a sheet cylindrical portion 35a having a substantially cylindrical shape arranged at the through hole 31f. According to the present preferred embodiment, since the insulating sheet 35 is arranged between the bottom portion 31b of the base member 31 and the coils 38, the bottom portion 31b can be arranged closer to the coils 38 in the axial direction. Accordingly, the thickness in the axial direction of the spindle motor 2 can be further reduced.

The stationary bearing unit 36 is a mechanism arranged to rotatably support the shaft 41 on the side of the rotating portion 4. The stationary bearing unit 36 is preferably fixed to the inner side of the cylindrical portion 31a. The stationary bearing unit 36 preferably includes a substantially cylindrical sleeve 36a and a cap 36b which is arranged to close the opening of a lower portion of the sleeve 36a. A gap between an inner circumference of the sleeve 36a and an outer circumference of the shaft 41 is filled with lubricating oil.

The rotating portion 4 preferably includes the shaft 41, a hub 42, and the rotor magnet 43.

The shaft 41 preferably is a substantially columnar member vertically extending along the center axis 9. The shaft 41 is arranged inside of the sleeve 36a such as to be rotatably supported with respect to the stationary bearing unit 36. The hub 42 is preferably fixed to the shaft 41, thereby rotating together with the shaft 41. The hub 42 has a supporting surface arranged to support the disk 12.

The rotor magnet 43 is preferably fixed to the hub 42. The rotor magnet 43 preferably includes a substantially circular ring shape arranged around the center axis 9. An inner circumference of the rotor magnet 43 is preferably opposed in the radial direction to an outer circumference of the plurality of teeth 37b of the stator core 37. The inner circumference of the rotor magnet 43 is a magnetic-pole surface on which north magnetic poles and south magnetic poles are alternately arranged in the circumferential direction.

According to the spindle motor 2 of the present preferred embodiment, when a driving current is applied to the coils 38 through the circuit board 33, a magnetic flux is generated in the radial direction at the plurality of teeth 37b of the stator core 37. Then, a torque is induced in a circumferential direction due the interaction of the magnetic flux between the teeth 37b and the rotor magnet 43, such that the rotating portion 4 rotates around the center axis 9 with respect to the stator portion 3. The disk 12 supported by the hub 42 rotates around the center axis 9 together with the shaft 41 and the hub 42.

Figure 4:
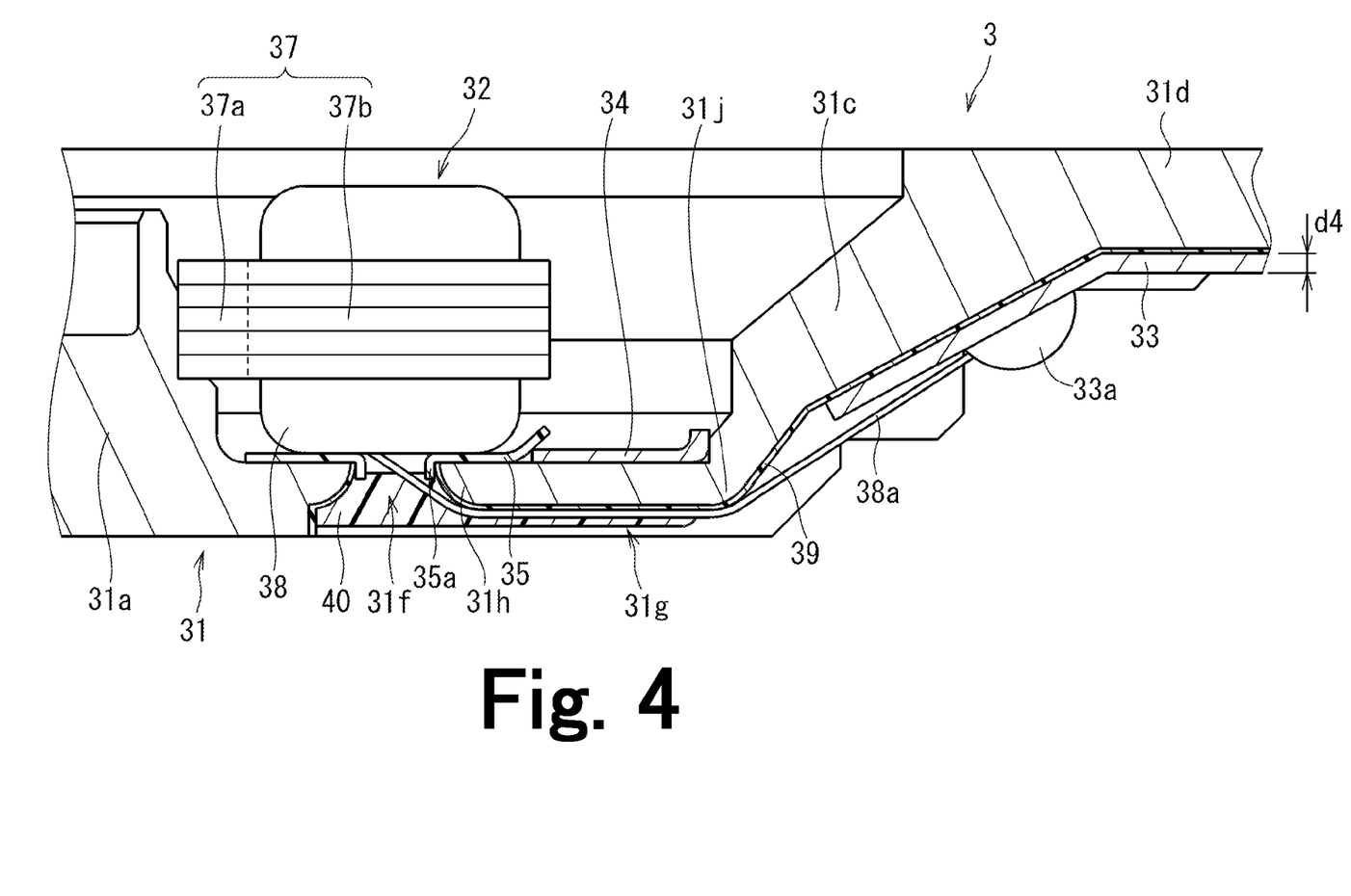
FIG. 4 is a schematic partial section view of a stator portion in the spindle motor according to a preferred embodiment of the present invention.
Figure 5:
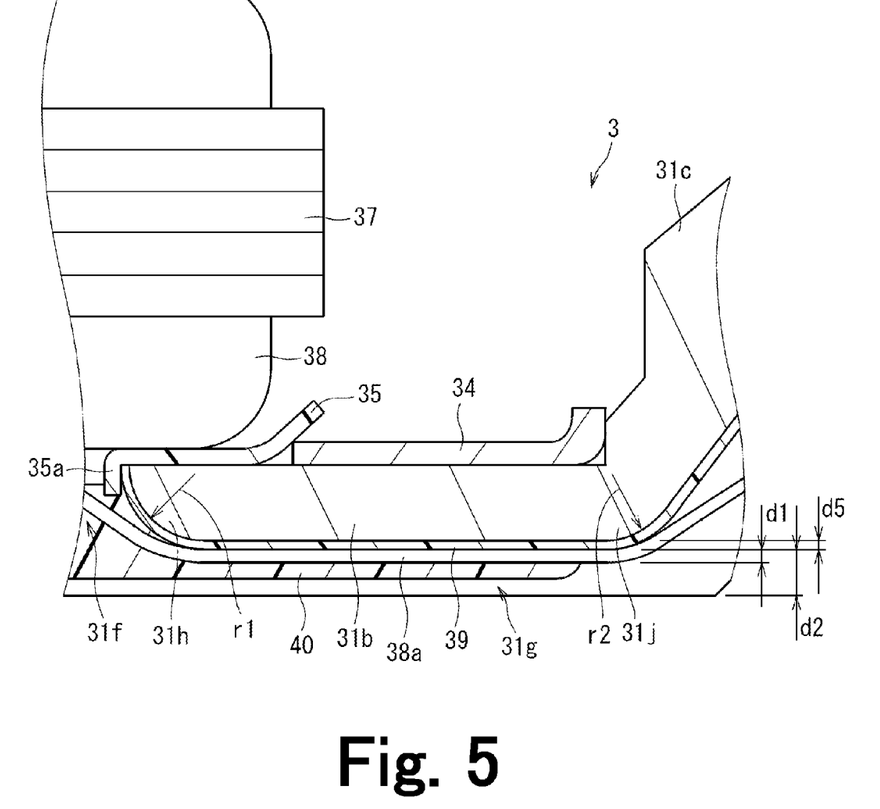
FIG. 5 is a schematic partial section view of the stator portion according to a preferred embodiment of the present invention.
Figure 6:
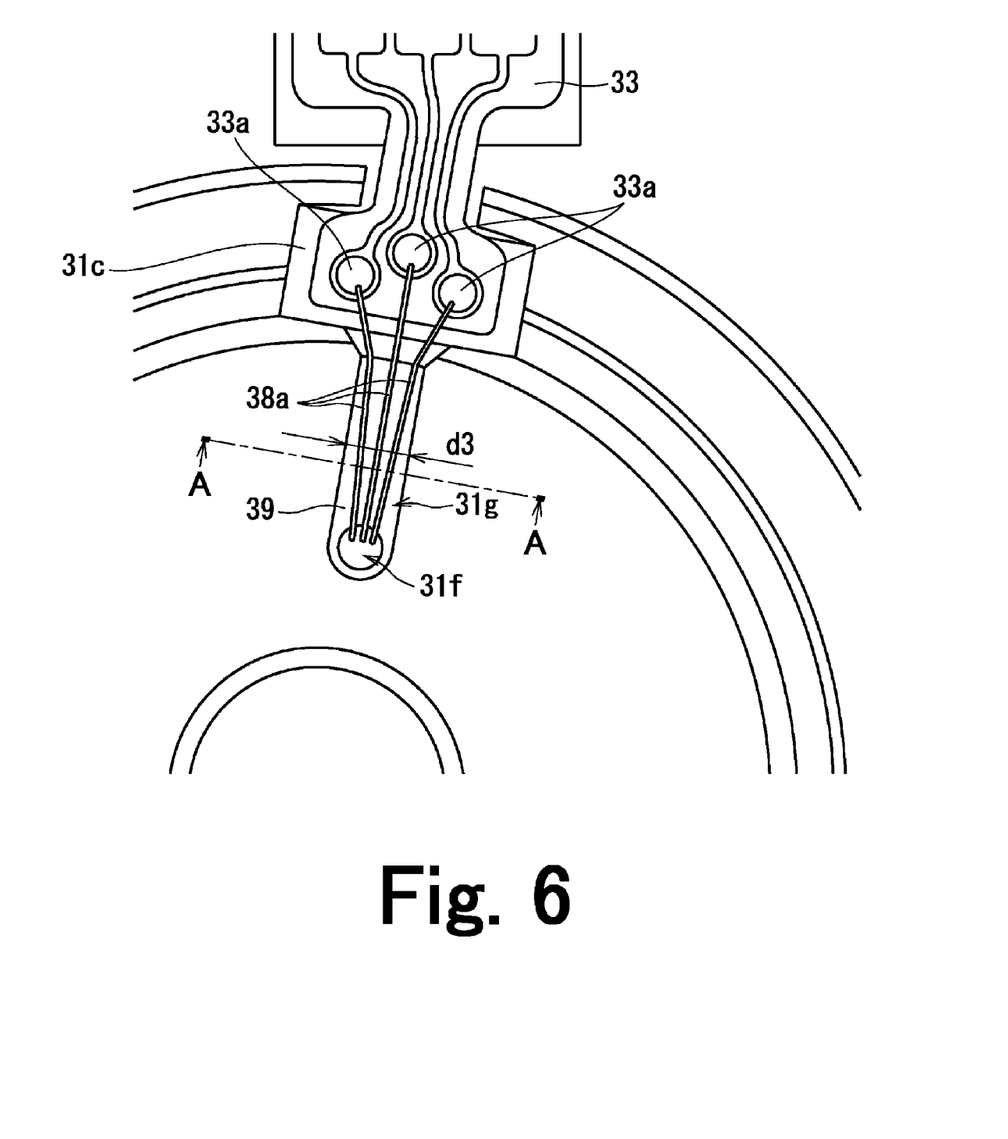
FIG. 6 is a schematic partial bottom view of the spindle motor according to a preferred embodiment of the present invention.
Figure 7:
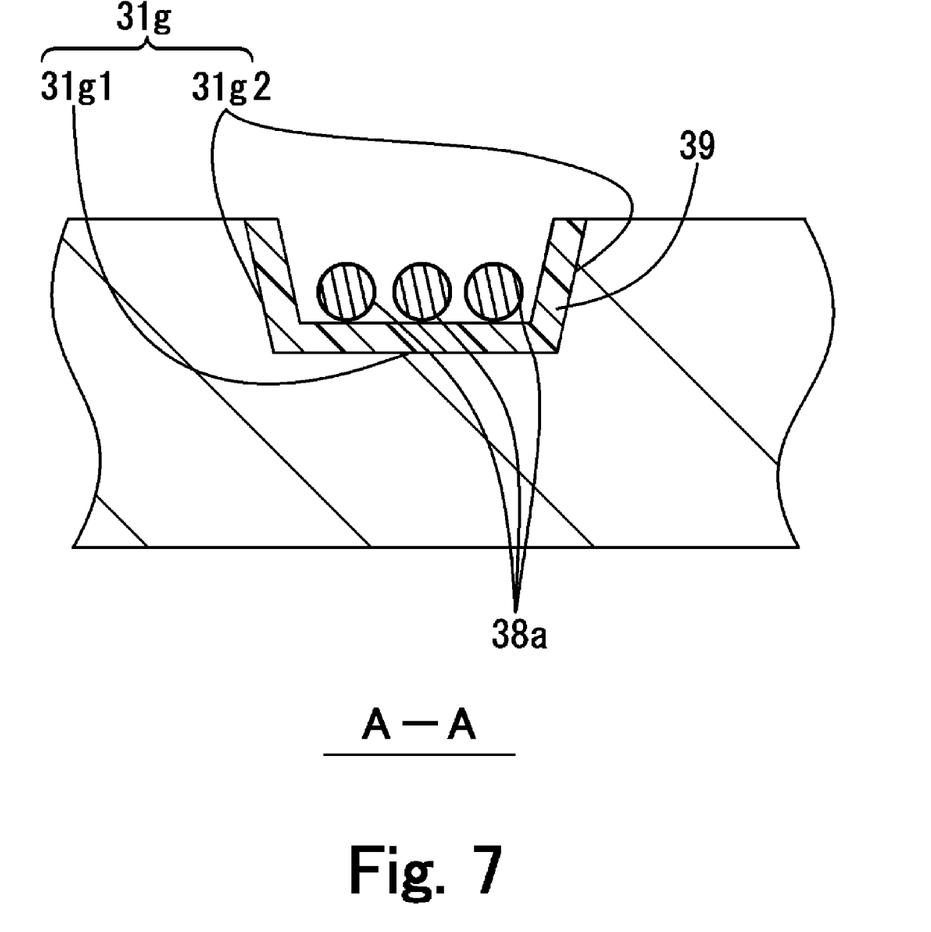
FIG. 7 is a schematic section view of FIG. 6 along the line A-A according to a preferred embodiment of the present invention.

Next, a route taken by the conducting wire 38a between the coil 38 and the soldering portion 33a will be described. FIG. 4 is a schematic partial longitudinal section view of the stator portion 3 including the route of the conducting wire 38a from the coil 38 to the soldering portion 33a. FIG. 5 is a schematic longitudinal section view of a portion of the route of the conducting wire 38a which is further enlarged. FIG. 6 is a schematic partial bottom view of the spindle motor 2 including the route of the conducting wire 38a. FIG. 7 is a schematic section view of FIG. 6 along the line A-A.

The through hole 31f extending in the axial direction is arranged at the bottom portion 31b of the base member 31. The through hole 31f is arranged below the coil 38. The lower surface of the bottom portion 31b of the base member 31 preferably includes a groove portion 31g extending in the radial direction. A lower end portion of the through hole 31f is preferably connected to the groove portion 31g, which preferably includes a first surface 31g1 and a second surface 31g2. The first surface 31g1 is arranged axially above the lower surface of the bottom portion 31b, while the second surface 31g2 is arranged to connect the lower surface and the first surface 31g1. The groove portion 31g preferably extends from the lower end position of the through hole 31f to the outer side in the radial direction, i.e., toward the circuit board 33.

The conducting wires 38a are preferably drawn from the coil 38 into the groove portion 31g through the through hole 31f. In other words, the conducting wires 38a are drawn to an area lower than the coil 38 and the soldering portion 33a of the circuit board 33. Then, the conducting wires 38a are preferably led to the outer side in the radial direction via the groove portion 31g. The conducting wires 38a are preferably connected via soldering (or any other desirable fixing method) to the soldering portion 33a of the circuit board 33 which is arranged at a portion of the lower surface of the base member 31 and radially outward of the bottom portion 31b. Accordingly, the circuit board 33 and the coil 38 are electrically connected.

According to the present preferred embodiment, as described above, the conducting wires 38a drawn to the lower side are preferably accommodated in the groove portion 31g. Accordingly, the lifting of the conducting wires 38a to the lower side of the bottom portion 31b can be minimized such that the thickness of the spindle motor 2 in the axial direction can be reduced.

The inside of the groove portion 31g and the outer side surface of the wall portion 31c preferably include an insulating layer 39. The insulating layer 39 preferably prevents the electric connection between the conducting wires 38a and the base member 31. The insulating layer 39 may be, for example, a layer of epoxy resin formed by electrodeposition coating. The conducting wires 38a drawn to the lower surface side of the bottom portion 31b preferably extend toward the circuit board 33 along the surface of the insulating layer 39. Note that the conducting wires 38a drawn from the coil 38 also have their own insulating layers (not shown), however, the insulating layers of the conducting wires 38a may be damaged by any factors. For example, if the conducting wire 38a comes into contact with the base member 31, the insulating layer thereof may sometimes be damaged. However, since the spindle motor 2 of the present preferred embodiment includes the insulating layer 39 for covering the base member 31, even if the insulating layer of the conducting wire 38a is damaged, the insulating property between the conducting wire 38a and the base member 31 can be maintained.

The through hole 31f is preferably covered by the insulating layer 39 up to a point at which an axially lowest portion of the cylindrical portion 35a and the insulating layer 39 overlap in the radial direction. By virtue of such configuration, the conducting wires 38a arranged at the through hole 31f are prevented from being in direct contact with the inner circumference of the base member 31. According to the spindle motor 2 of the present preferred embodiment, the insulating sheet 35 is not extended to the lower surface side of the bottom portion 31b, but the insulating layer 39, which is thinner than the insulating sheet 35, is arranged at the lower surface of the bottom portion 31b. With such a configuration, the thickness of the spindle motor 2 in the axial direction can be further reduced.

The insulating layer 39 preferably covers the opening edge portion 31h of the base member 31. Accordingly, when the conducting wire 38a may come into contact with the opening edge portion 31h at the opening edge portion 31h, the electric connection between the conducting wire 38a and the base member 31 including the opening edge portion 31h can be prevented. Even in the case where the insulating thin layer of the conducting wire 38a may be damaged, the electric connection between the conducting wire 38a and the base member 31 can be prevented by the insulating layer 39 which covers the opening edge portion 31h.

As shown in FIG. 5, the opening edge portion 31h is preferably rounded to include a substantially circular arc shape in the cross-section including the center axis 9. By virtue of such configuration, the damage of the insulating layer which covers the conducting wire 38a can be minimized at the opening edge portion 31h. A curvature radius r1 of the opening edge portion 31h in the cross-section including the center axis 9 is preferably larger than a diameter d1 of the conducting wire 38a. By virtue of such configuration, the conducting wires 38a may be bent naturally along the opening edge portion 31h while the damage to the conducting wires 38a is minimized. It is further preferred that the curvature radius r1 of the opening edge portion 31h may be at least twice as large as the diameter d1 of the conducting wire 38a.

In addition, a corner portion 31j arranged at the boundary defined between the first portion 31g1 and the outer side surface of the wall portion 31c is preferably covered with the insulating layer 39. By virtue of such configuration, even if the conducting wire 38a comes into contact with the corner portion 31j in the corner portion 31j, the electric connection between the conducting wire 38a and the base member 31 including the corner portion 31j is prevented. Even in the case where the insulating layer of the conducting wire 38a is damaged, the electric connection between the conducting wire 38a and the base member 31 can be prevented.

As shown in FIG. 5, the corner portion 31j is also preferably rounded to include a substantially circular arc shape in the cross-section including the center axis 9. By virtue of such configuration, the damage of the insulating layer which covers the conducting wires 38a can be minimized at the corner portion 31j. A curvature radius r2 of the corner portion 31j in the cross-section including the center axis 9 is preferably larger than the diameter d1 of the conducting wire 38a. By virtue of such configuration, the conducting wires 38a may be bent naturally along the corner portion 31j while the damage to the conducting wires 38a is minimized. As a result, the damage of the insulating thin layer which covers the conducting wire 38a can be further suppressed. It is further preferred that the curvature radius r2 of the corner portion 31j may be, at least, twice as large as the diameter d1 of the conducting wire 38a.

In the present preferred embodiment, the lower surface of the bottom portion 31b in the groove portion 31g is also covered with the insulating layer. By virtue of such configuration, the conducting wire 38a accommodated in the groove portion 31g is prevented from being electrically connected to the lower surface of the bottom portion 31b in the groove portion 31g at a portion between the opening edge portion 31h and the corner portion 31j. By virtue of such configuration, the conducting wire 38a can be arranged more closely to the lower surface of the bottom portion 31b in the groove portion 31g. Therefore, the depth d2 of the groove portion 31g in the axial direction can be decreased. As a result, the thickness of the spindle motor 2 in the axial direction can be further reduced. Note that the conducting wires 38a may be in contact with the lower surface of the bottom portion 31b in the groove portion 31g, or may be arranged opposed to the lower surface of the bottom portion 31b in the groove portion 31g with a slight gap defined therebetween.

The depth d2 of the groove portion 31g in the axial direction is preferably larger than the diameter d1 of the conducting wire 38a. By virtue of such configuration, the conducting wire 38a can be led toward the circuit board 33 without protruding from the groove portion 31g. According to the spindle motor 2 of the present preferred embodiment, the depth d2 of the groove portion 31g in the axial direction is set such that the depth d2 is smaller than the sum of the diameter d1 of the conducting wire 38a and a thickness d4 of the circuit board 33. The circuit board 33 is not arranged on the lower surface of the bottom portion 31b of the base member 31, but arranged at a portion of the lower surface of the base member 31 radially outward of the bottom portion 31b. By virtue of such configuration, the thickness of the spindle motor 2 in the axial direction can be further reduced.

According to the present preferred embodiment, the second surface 31g2 is also covered by the insulating layer 39. Accordingly, it is possible to prevent the electric connection between the conducting wire 38a accommodated in the groove portion 31g and the side surface of the groove portion 31g. With such a configuration, the conducting wire 38a can be arranged more closely to the side surface of the groove portion 31g. Accordingly, a width d3 of the groove portion 31g can be narrowed. If the depth d3 of the groove portion 31g is narrowed, the entire thickness of the base member 31 can be increased, so that the rigidity of the base member 31 will be enhanced.

According to the present preferred embodiment, the conducting wires 38a are preferably arranged from the coils 38 to the soldering portion 33a with almost no slack. In other words, the conducting wires 38a are arranged with some tension, which prevents the conducting wires 38a from being lifted. However, when the conducting wires 38a are tensioned, the conducting wires 38a may come into contact with the base member 31. According to the present preferred embodiment, the conducting wires 38a are prevented from being electrically connected to the base member 31 due to the arrangement of the insulating layer 39.

According to the present preferred embodiment, the conducting wires 38a are preferably fixed via the adhesive 40 to the base member 31 in the groove portion 31g. Accordingly, the lifting of the conducting wires 38a can be further prevented. By virtue of such configuration, the conducting wires 38a are prevented from coming into contact with portions other than the insulating layer 39. The adhesive 40 preferably seals the through hole 31f, and fixes the sheet cylindrical portion 35a of the insulating sheet 35 to the base member 31.

Table 1 shows test results related to the insulating property of the electrodeposition coating layer using the epoxy resin. According to the test, the result of which is shown in Table 1, an electrodeposition coating layer using the epoxy resin was preferably arranged at the surface of a sample of aluminum alloy, and a voltage of 0.1 kV to 0.5 kV was applied across an electrode disposed on the electrodeposition coating layer and the sample. The thickness of the electrodeposition coating layer was about 10 μm. In Table 1, the symbol "O" indicates the result in which sufficient insulation is ensured between the electrode and the sample. In the table, the symbol "X" indicates the result in which the insulation between the electrode and the sample is not sufficiently attained. In Table 1, the results of three trials #1 to #3 are shown.

TABLE 1

| V [kV] | #1 | #2 | #3 |
|---|---|---|---|
| 0.1 | O | O | O |
| 0.2 | O | O | O |
| 0.3 | O | O | O |
| 0.4 | X | X | X |
| 0.5 | X | X | X |

Referring to the results in Table 1, in the case where the insulating layer 39 is the electrodeposition coating layer using the epoxy resin, if the layer thickness is about 10 μm or greater, the sufficient insulating property can be secured for the voltages equal to or lower than 0.3 kV. The voltage across the base member 31 and the conducting wires 38a is generally assumed to be lower than 0.3 kV. Accordingly, if the layer thickness d5 of the insulating layer 39 is about 10 μm or more, the electric connection between the base member 31 and the conducting wires 38a can be sufficiently prevented. It is understood that as the layer thickness of the insulating layer 39 is increased, the reliability of insulation is increased. For the above-mentioned reason, the layer thickness d5 of the insulating layer 39 is more preferably about 15 μm or greater, for example. Further more preferably, the layer thickness d5 of the insulating layer 39 may be about 20 μm or more, for example.

On the other hand, in the case where the insulating layer 39 is an electrodeposition coating layer using an epoxy resin, if the layer thickness is too large, the deposition of the insulating layer 39 by electrodeposition coating may sometimes be insufficient. Accordingly, it is preferred that the layer thickness of the insulating layer 39 may be about 30 μm or less, for example.

While preferred embodiments of the present invention have been described above, it is to be understood that the present invention is not limited to the above-described preferred embodiments.

The material for forming the insulating layer 39 may be the above-mentioned epoxy resin, or may be an acrylic resin, for example. The method for forming the insulating layer 39 may be the above-mentioned electrodeposition coating, or may be electrostatic coating, for example.

As described in the preferred embodiments, the three conducting wires 38a may extend to the circuit board 33 through the common through hole 31f and the common groove portion 31g. Alternatively, through holes 31f and groove portions 31g may be provided for each of the three conducting wires 38a, respectively. However, it is more preferable that the three conducting wires 38a may be arranged through the common through hole 31f and the common groove portion 31g because the loss of rigidity of the base member 31 can be suppressed. The number of conducting wires 38a led from the coil 38 may be one or two, or four or more.

According to the above-mentioned preferred embodiment, the opening edge portion 31h of the base member 31 includes the circular arc shape in which the edge is chamfered in the cross-section including the center axis 9. Alternatively, the opening edge portion 31h of the base member 31 may have a shape in which the edges are linearly chamfered in the cross-section including the center axis 9, for example. In the above-mentioned preferred embodiment, the corner portion 31j arranged at the boundary between the lower surface of the bottom portion 31b and the outer side surface of the wall portion 31c includes the circular arc shape in which the edges are chamfered in the cross-section including the center axis 9. Alternatively, the corner portion 31j may have a shape in which the edges are linearly chamfered in the cross-section including the center axis 9.

The present invention may be applied to a spindle motor for rotating a disk other than the magnetic disk such as, for example, an optical disk, and a disk drive apparatus provided with such a spindle motor.

The present invention is applicable to a spindle motor and a disk drive apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A spindle motor comprising:
a stator portion; and
a rotor portion supported in a rotatable manner around a vertically extending center axis with respect to the stator portion, wherein
the stator portion includes:
a substantially cup-shaped base member including a bottom portion extending in a radial direction, a wall portion extending upwards from an outer edge portion of the bottom portion, an outer flat portion extending outwardly in the radial direction from an upper end portion of the wall portion, and a through hole arranged axially through the bottom portion;
a coil accommodated in the base member;
a circuit board arranged at a lower surface of a wall portion or a lower surface of the outer flat portion, and electrically connected to the coil; and
an insulating layer arranged to cover a lower surface of the bottom portion and an opening edge portion at the lower side of the through hole of the bottom portion; and
a conducting wire extending from the coil is arranged through the through hole and along a surface of the insulating layer, and connected to the circuit board.

2. A spindle motor according to claim 1, wherein the opening edge portion includes a chamfered portion.

3. A spindle motor according to claim 2, wherein the opening edge portion includes a substantially circular arc shape including a curvature radius larger than a diameter of the conducting wire seen at a cross-section including a center axis.

4. A spindle motor according to claim 1, wherein a corner portion between the lower surface of the bottom portion and a radially outer side surface of the wall portion is further covered with the insulating layer.

5. A spindle motor according to claim 4, wherein the corner portion has a chamfered shape.

6. A spindle motor according to claim 5, wherein the corner portion includes a substantially circular arc shape including a curvature radius larger than a diameter of the conducting wire at a cross-section including a center axis.

7. A spindle motor according to claim 1, wherein
the bottom portion includes at a lower surface thereof a groove portion arranged between the through hole and the circuit board,
the groove portion includes a first surface arranged above the bottom portion and a second surface arranged to connect the lower surface and the first surface; and
the conducting wire is accommodated at the groove portion.

8. A spindle motor according to claim 7, wherein the first surface is covered with the insulating layer.

9. A spindle motor according to claim 8, wherein the second surface is covered by the insulating layer.

10. A spindle motor according to claim 9, wherein a depth of the groove portion in an axial direction is smaller than a sum of a thickness of the circuit board and a diameter of the conducting wire.

11. A spindle motor according to claim 8, further comprising:
an insulating sheet including a sheet cylindrical portion including a substantially cylindrical shape arranged at the through hole between the bottom portion and the coil; wherein
a circumferentially inner surface of the through hole is covered with the insulating layer at least up to a portion thereof where said portion overlaps in a radial direction with a bottom end portion of the sheet cylindrical portion.

12. A disk drive apparatus comprising:
a spindle motor of claim 8;
an access unit arranged to perform at least one of the reading and writing of data with respect to a disk supported by the rotating portion of the spindle motor; and
a housing arranged to accommodate the spindle motor and the access unit.

13. A spindle motor according to claim 7, wherein
a depth of the groove portion in the axial direction is smaller than a sum of a thickness of the circuit board and a diameter of the conducting wire.

14. A spindle motor according to claim 13, further comprising
an insulating sheet including a sheet cylindrical portion of a substantially cylindrical shape positioned in the through hole between the bottom portion and the coil; wherein
a circumferentially inner surface of the through hole is covered with the insulating layer at least up to a portion thereof where said portion overlaps in a radial direction with a bottom end portion of the sheet cylindrical portion.

15. A disk drive apparatus comprising:
a spindle motor of claim 7;
an access unit arranged to perform at least one of the reading and writing of data with respect to a disk supported by the rotating portion of the spindle motor; and
a housing arranged to accommodate the spindle motor and the access unit.

16. A spindle motor according to claim 1, wherein the conducting wire is fixed to the base member by an adhesive.

17. A spindle motor according to claim 1, wherein
the insulating layer is an epoxy electrodeposition coating layer, and
a thickness of the insulating layer is at least about 10 μm.

18. A spindle motor according to claim 1, further comprising:
an insulating sheet including a sheet cylindrical portion of a substantially cylindrical shape positioned in the through hole between the bottom portion and the coil; wherein
a circumferentially inner surface of the through hole is covered with the insulating layer at least up to a portion thereof where said portion overlaps in a radial direction with a bottom end portion of the sheet cylindrical portion.

19. A spindle motor according to claim 18, wherein
the lower surface of the bottom portion includes a groove portion extending from the through hole toward the circuit board; and
the conducting wire is accommodated on the inside of the groove portion.

20. A disk drive apparatus comprising:
a spindle motor of claim 1;
an access unit arranged to perform at least one of the reading and writing of data with respect to a disk supported by the rotating portion of the spindle motor; and
a housing arranged to accommodate the spindle motor and the access unit.

* * * * *